Oct. 24, 1961     F. S. WYMAN     3,005,336
PRECISION SPECIMEN HOLDER
Filed Nov. 6, 1958
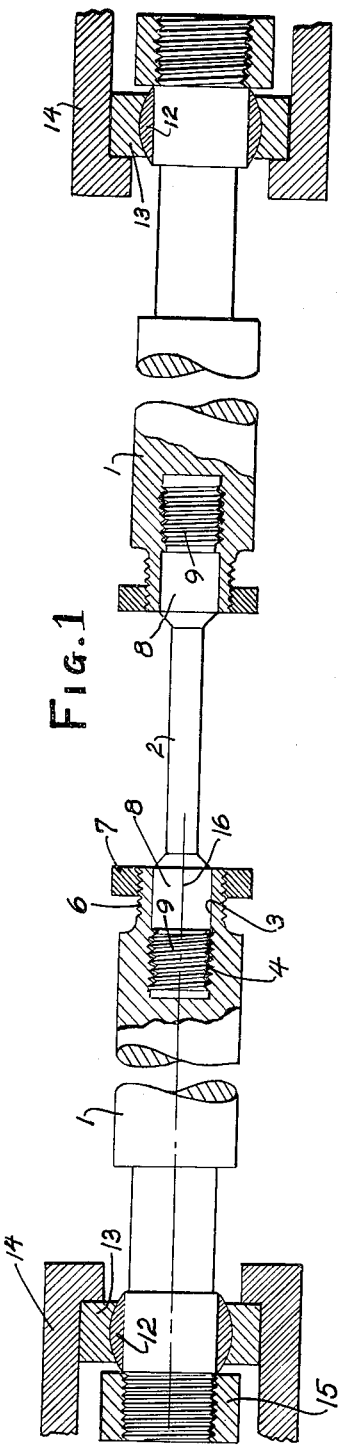
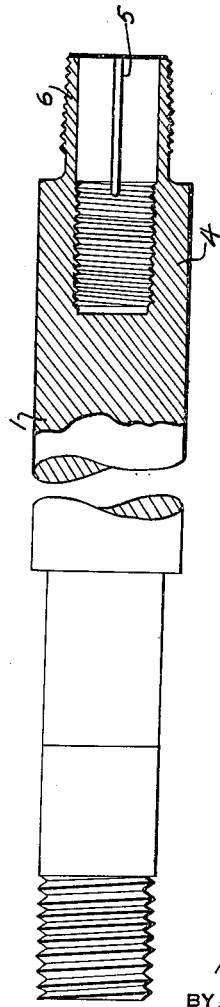
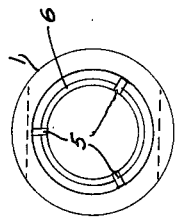
INVENTOR
Forrester S. Wyman
BY *Edward A. Hathaway*
Attorney

United States Patent Office 3,005,336
Patented Oct. 24, 1961

3,005,336
PRECISION SPECIMEN HOLDER
Forrester S. Wyman, Waltham, Mass., assignor to Baldwin-Lima-Hamilton Corporation, a corporation of Pennsylvania
Filed Nov. 6, 1958, Ser. No. 772,200
1 Claim. (Cl. 73—103)

This invention relates to specimen holders for materials testing equipment.

The testing of specimens under tensile loading, especially in creep machines and in high temperature tension tests, has involved the difficulty of eliminating bending effects in the specimens. The problem becomes extremely critical especially in brittle materials including, among others, ceramic-like materials where bending forces may cause fracture of the specimen. In any event, regardless of the material, the uneven load distribution across the specimen will cause errors in the test results. The problem exists even where threaded-end specimens are employed since it is impractical to obtain threaded fits of the precision required to reduce eccentric loading to an acceptable degree.

Many attempts to eliminate the introduction of bending effects into tension specimens have included the use of universal joints, knife edges, spherical seats, etc., in an effort to obtain self-alignment of the specimen and specimen holder axes. The deficiencies of these devices have been most noticeable in precision testing where there is a critical demand for pure tensile loading in order to insure accurate as well as reproduceable results. It is an object of my invention to provide an improved materials specimen holder for minimizing or eliminating bending effect in the specimen so as to obtain a high degree of pure tensile loading whereby reproduceably accurate results can be accomplished throughout the testing of many specimens.

Another object is to provide an improved materials specimen holder that utilizes threaded-end specimens but eliminates bending effects even though misaligning influence might be present in the threads.

A still further object is to provide an improved specimen holder that is highly effective in eliminating bending effects in threaded-end specimens and yet is relatively simple and economical in construction and operation so that specimens may be inserted with ease and dispatch while at the same time obtaining the desired high degree of precision measurements.

Other objects and advantages will be more apparent to those skilled in the art from the following description of the accompanying drawings in which:

FIG. 1 is a partial elevational view of my improved holders together with a test specimen and connections to a loading mechanism of any suitable and well-known type of creep or tensile testing machine;

FIG. 2 is an enlarged view of one of my improved holders partially broken away to show details of construction; and FIG. 3 is an end view of the right of FIG. 2.

In the particular embodiment of the invention disclosed herein for the purpose of showing one particular form among others that the invention might taken in practice, I provide duplicate holders 1 at each end of the specimen 2 and hence the description of one holder will suffice for both. The holder has a cylindrical bore 3 terminating at its inner end in a threaded coaxial recess 4. The wall of the cylindrical portion has a plurality of slots 5, specifically shown as three, and is provided with a longitudinally tapered outer surface upon which threads 6 are formed to receive a nut 7. This cylindrical bore and tapered threaded end form a collet to be tightened upon a cylindrical section 8 of the specimen 2. The cylindrical section terminates in a threaded shank 9 to be received, preferably loosely, in the threads 4. The outer ends of the holders 1 are provided with a usual ball 12 and a spherical seat member 13 which is connected to well-known loading elements 14 of either a creep machine or a tensile loading machine. A nut 15 threaded on the end of the holder 1 insures transmission of a loading force from the loading element 14 through the ball joint to the holder and thence to the specimen through the threaded end 9.

The bore 3 is formed with a great deal of precision so that its axis 16 passes through the center of ball 12. Hence when the specimen is machined so that its cylindrical portions 8 have a complementary snug fit with bore 3 the radial clamping action of the collet will insure highly accurate axial positioning of the specimen independently of the threads 4 and 9 and yet these latter threads will insure transmission of the loading force to the specimen.

Inasmuch as the axis of the cylindrical bore 3 has been machined with a great deal of accuracy to coincide with the axis of ball 12 it is seen that the threads 9, which are preferably slightly loose, cannot transmit a bending action to the reduced test portion of specimen 2.

It has been found in actual practice that my holder obtains an improvement in the reduction in bending in test specimens of the order 10 or 20 to 1 over what is usually found in so-called thread-end holders where the threads (at one or both ends of the specimen) must be relied upon to center the specimen within the holder. On my improved holder the jaws of the collet chucks are closed equally and concentrically on the cylindrical portion 8 of the specimen and cause the center-line of the specimen and of the holder to coincide without reference to the accuracy or fit of the supporting threads, thereby insuring perfect alignment of specimen and holder with consequent elimination of specimen bending in tension due to misalignment. My holder is suitable for low and/or high temperature operation, can be applied to any existing creep machine or to tensile testing machines, and does not require any special skill on the part of the operator to obtain reproduceable precision results.

It will, of course, be understood that various changes in details of construction and arrangement of parts may be made by those skilled in the art without departing from the spirit of the invention as set forth in the appended claim.

I claim:

A materials testing tension specimen holder having a straight cylindrical centering bore of normally constant diameter concentric throughout its length about a common axis and terminating at one end in a coaxial threaded recess to receive a threaded end of a specimen thereby to provide a threaded connection for transmitting to the specimen substantially the entire tension load, and the bore being open at its other end to receive initially through that end a snugly fitting complementary cylindrical section of the specimen so that the specimen axis is coaxial with said common axis independently of the threaded connection and said constant diameter of the bore being effective during specimen loading to be independent of any load transmitted through the specimen, whereby by loading the specimen through the threaded connection independently of the centering bore slippage in a direction axially of the bore may occur between the centering bore and the cylindrical section of the sepcimen during straining thereof under load, thereby to minimize bending effects from any misaligning tendencies of the threads.

References Cited in the file of this patent

UNITED STATES PATENTS 1,122,289    Loveland _____ Dec. 29, 1914
2,608,857    La Torre et al. _____ Sept. 2, 1952